US010215260B2

(12) United States Patent
Lu et al.

(10) Patent No.: US 10,215,260 B2
(45) Date of Patent: Feb. 26, 2019

(54) INTEGRATIVE TRANSMISSION CHAIN OF HYBRID-DRIVE WIND TURBINE AND A GEARBOX USED BY THE TRANSMISSION CHAIN

(71) Applicant: CRRC QISHUYAN INSTITUTE CO., LTD., Changzhou, Jiangsu (CN)

(72) Inventors: Qunfeng Lu, Jiangsu (CN); Baosong Zhang, Jiangsu (CN); Guozhong Jin, Jiangsu (CN)

(73) Assignee: CRRC QISHUYAN INSTITUTE CO., LTD., Jiangsu (CN)

( * ) Notice: Subject to any disclaimer, the term of this patent is extended or adjusted under 35 U.S.C. 154(b) by 258 days.

(21) Appl. No.: 15/109,038

(22) PCT Filed: Dec. 30, 2014

(86) PCT No.: PCT/CN2014/095557
§ 371 (c)(1),
(2) Date: Jun. 29, 2016

(87) PCT Pub. No.: WO2015/101288
PCT Pub. Date: Jul. 9, 2015

(65) Prior Publication Data
US 2016/0319909 A1    Nov. 3, 2016

(30) Foreign Application Priority Data

Dec. 31, 2013  (CN) .......................... 2013 1 0747728
Dec. 31, 2013  (CN) .................... 2013 2 0886569 U (51) Int. Cl.
*F16H 1/28*  (2006.01)
*F16H 1/36*  (2006.01)
(Continued)

(52) U.S. Cl.
CPC ................. *F16H 1/36* (2013.01); *F03D 9/25* (2016.05); *F03D 15/00* (2016.05); *F03D 15/10* (2016.05);
(Continued)

(58) Field of Classification Search
CPC . F16H 1/36; F16H 57/082; F16H 1/28; F03D 15/00; Y02E 10/722; F05B 2260/40311
See application file for complete search history.

(56) References Cited

U.S. PATENT DOCUMENTS 4,856,377 A    8/1989  Goudreau et al.
4,954,123 A *  9/1990  Kurywczak ............... F16H 1/36
                                                         475/179

(Continued)

FOREIGN PATENT DOCUMENTS

CN    201348010 A    11/2009
CN    201763546 U     3/2011
(Continued)

OTHER PUBLICATIONS

Second Chinese Office Action corresponding to Application No. 201310747728.6; dated Oct. 21, 2015, with English translation.
(Continued)

*Primary Examiner* — David J Hlavka
(74) *Attorney, Agent, or Firm* — Cantor Colburn LLP (57) ABSTRACT

An integrative transmission chain of hybrid-drive wind turbine and a gearbox used by the transmission chain, comprising a front housing body, a rear housing body, a main shaft and a planet carrier, and further comprising: an inner ring gear on the main shaft, N intermediate gears (N≥3), N planet gear shafts provided with a first stage planet gear and a second stage planet gear, an output shaft, and a sun gear; wherein the inner ring gear, the intermediate gear and the first stage planet gear form a first stage fixed shaft
(Continued)

transmission pair, and the second stage planet gear and the sun gear form a second stage fixed shaft transmission pair; and wherein an upwind end of the output shaft is axially rotatably disposed on the planet carrier and a downwind end of the output shaft protrudes outside the rear housing body; the downwind end which protrudes outside is connected to an upwind end of the rotor of the generator so as to drive the rotor of the generator in rotation, and a downwind end of the rotor of the generator is supported in an inner hole of the stator of the generator via a generator stator main bearing. The transmission chain according to the invention has a high integration level, a simple structure, a light weight, a short axial length, and a high transmission ratio, etc., and is very suitable for a high power wind power generating apparatus.

22 Claims, 4 Drawing Sheets

(51) Int. Cl.
    *F03D 80/70*     (2016.01)
    *F03D 9/25*     (2016.01)
    *F03D 15/10*     (2016.01)
    *F16H 57/08*     (2006.01)
    *F03D 15/00*     (2016.01)

(52) U.S. Cl.
    CPC .............. *F03D 80/70* (2016.05); *F16H 1/28* (2013.01); *F16H 57/082* (2013.01); *F05B 2260/40311* (2013.01); *Y02E 10/722* (2013.01)

(56) References Cited

U.S. PATENT DOCUMENTS

| | | | | |
|---|---|---|---|---|
| 9,541,172 | B1* | 1/2017 | Wright | F16H 3/666 |
| 9,664,261 | B1* | 5/2017 | Linton | F16H 3/724 |
| 9,920,818 | B2* | 3/2018 | Wright | F16H 3/666 |
| 2009/0221397 | A1* | 9/2009 | Demtroder | F16H 1/28 475/332 |
| 2011/0143880 | A1* | 6/2011 | Minadeo | F16H 1/48 475/346 |
| 2012/0141270 | A1* | 6/2012 | Minadeo | F16O 33/6659 416/1 |
| 2015/0192110 | A1* | 7/2015 | Pedersen | F16H 1/227 475/149 |
| 2015/0340927 | A1* | 11/2015 | Maiwald | H02K 7/116 475/149 |
| 2016/0290471 | A1* | 10/2016 | Okamoto | F16H 3/663 |
| 2017/0067539 | A1* | 3/2017 | Matsumoto | F16H 1/28 |

FOREIGN PATENT DOCUMENTS

| | | |
|---|---|---|
| CN | 103089929 A | 5/2013 |
| CN | 103742607 A | 4/2014 |
| CN | 203717796 U | 7/2014 |

OTHER PUBLICATIONS

First Chinese Office Action corresponding to Application No. 201310747728.6; dated Mar. 11, 2015, with English translation.
International Search Report corresponding to Application No. PCT/CN2014/095557; dated Mar. 13, 2015, with English translation.
Written Opinion of the International Searching Authority corresponding to Application No. PCT/CN2014/095557; dated Mar. 13, 2015.

* cited by examiner

Fig. 4

INTEGRATIVE TRANSMISSION CHAIN OF HYBRID-DRIVE WIND TURBINE AND A GEARBOX USED BY THE TRANSMISSION CHAIN

CROSS REFERENCE TO RELATED APPLICATIONS

This is the U.S. national stage of application No. PCT/CN2014/095557, filed on Dec. 30, 2014. Priority under 35 U.S.C. § 119(a) and 35 U.S.C. § 365(b) is claimed from Chinese Application No. 201320886569.3, filed Dec. 31, 2013, and Chinese Application No. 201310747728.6, filed Dec. 31, 2013, the disclosures of which are also incorporated herein by reference.

FIELD OF THE INVENTION

The present invention pertains to the technical field of wind turbine, and relates to an integrative transmission chain of hybrid-drive wind turbine and a gearbox used by the transmission chain.

BACKGROUND

In the structure of a hybrid-drive wind turbine, the rotating speed of wind wheel is increased to certain times larger by a gearbox and then is input to a generator (e.g., a permanent magnet generator). Essentially, a speed-up gearbox is additionally installed onto a direct-driven wind power generator. Through gear transmission, the hybrid-drive wind turbine increases the rotating speed input from a hub by about 25-40 times, for example, and the both the size and weight of the generator can be greatly reduced as compared to the direct-driven wind power generator. Therefore, the hybrid-drive wind turbine not only has the following advantages existing in the direct-driven wind turbine, such as making it easy to realize low-voltage passing through, being free of high-speed output shaft that is prone to failures, removing failure points such as electric brush, slip or the like from the motor, having a small impact on the power grid, outputting high-quality electrical energy, but also the hybrid-drive wind turbine can effectively avoid disadvantages such as high cost and difficult in hoisting caused by a large direct-driven wind power generator.

Meanwhile, all the current large wind power generators have requirements on lightweight, high integration and high reliability so as to reduce electricity cost. The characteristics of hybrid-drive wind turbines are particularly suitable for large wind machines, and thus have a bright prospect of development.

Currently, a transmission chain of hybrid-drive wind turbine and a gearbox used for the transmission chain typically use a conventional two stage NGW solution, which uses too many elements and has a complicated structure, thus making the processing and assembling difficult; in an existing transmission chain based on NGW solution, all the planet gears receive loads at both faces, thus increasing the possibility of gear failure; moreover, the planet gears rotate, thus increasing the complexity in lubricating solution.

Chinese patent application for invention with publication No. CN101846155A and title "a megawatt scale quasi planet gear hybrid-drive wind turbine speed-up gearbox" discloses a megawatt scale quasi planet gear hybrid-drive wind turbine speed-up gearbox which is easy to assemble and disassemble, can be repaired inside nacelles, has a light weight and a low difficulty in manufacturing process. This patent application uses such a "(input) inner ring gear-two second intermediate gears-quasi planet gear-intermediate gear-(output) center gear" single stage quasi planet structure which conducts two shunts in one plane. Due to the addition of two intermediate gears, such a hybrid-drive wind turbine speed-up gearbox structure results in a two-time shunt, and the load bearing capability can therefore be significantly improved. Meanwhile, due to the single stage transmission, the axial length is short, and the required installation space is small; however, it is obvious that the hybrid-drive wind turbine speed-up gearbox of this patent application has a disadvantage of low transmission ratio and thus cannot meet requirements imposed by high power wind turbines.

SUMMARY OF THE INVENTION

An object of the invention is to integrate the gearbox with the generator so that a transmission chain of hybrid-drive wind turbine is realized integrally.

Another object of the invention is to reduce the axial length of the transmission chain of hybrid-drive wind turbine.

Further another object of the invention is to propose a gearbox which is simple in structure, low in cost and has a compact and reasonable configuration so that the requirements imposed by high power wind turbines are met.

Still further another object of the invention is to propose an integrative transmission chain of hybrid-drive wind turbine and a gearbox used for it, in which the gearbox and the generator are integrated, and advantages such as high reliability, light weight, short axial length, reasonable structure and convenient maintenance, assembling and disassembling are brought about.

In order to realize the above or other objects, the invention provides the following technical solutions.

According to an aspect of the invention, a gearbox is provided, which is used for a transmission chain of hybrid-drive wind turbine and comprises a front housing body, a rear housing body, a main shaft and a planet carrier;

the planet carrier is fixedly disposed between the front housing body and the rear housing body, and the main shaft is rotatably disposed on the front housing body and the planet carrier;

the gearbox further comprises:

an inner ring gear fixedly disposed on the main shaft;

N planet gear shafts that are axially rotatably disposed on the planet carrier and the rear housing body, each of the planet gear shafts is provided with a first stage planet gear and a second stage planet gear, wherein N≥3;

intermediate gears correspondingly disposed between each first stage planet gear and the inner ring gear; and an output shaft whose upwind end is axially rotatably disposed on the planet carrier and whose downwind end protrudes outside the rear housing body;

a sun gear disposed on the output shaft;

wherein the N intermediate gears and the N first stage planet gears are disposed in the planet carrier, and the sun gear and the N second stage planet gears are disposed in a cavity formed by the planet carrier and the rear housing body;

wherein the inner ring gear, the intermediate gear and the first stage planet gear form a first stage fixed shaft transmission pair, and the second stage planet gear and the sun gear form a second stage fixed shaft transmission pair.

According to another aspect of the invention, an integrative transmission chain of hybrid-drive wind turbine which uses the gearbox is provided, wherein a downwind end of the output shaft is connected to an upwind end of a rotor of the generator so as to drive the rotor of the generator in rotation, and a downwind end of the rotor of the generator is supported in an inner hole of a stator of the generator via a generator stator main bearing.

According to further another aspect of the invention, a wind power generating apparatus is provided, which comprises the above described integrative transmission chain of hybrid-drive wind turbine.

BRIEF DESCRIPTION OF THE DRAWINGS

The above and other objects and advantages of the invention will become more complete and apparent from the following detailed description with reference to the accompanying drawings, wherein identical or similar elements are denoted by identical reference signs.

LIST OF REFERENCE SIGNS 1 hub connection flange;
2 upwind bearing of main shaft;
3 downwind bearing of main shaft;
4 upwind bearing of planet gear shaft;
5 main shaft;
5-1 upwind end of main shaft;
5-2 small diameter portion of downwind end of main shaft;
5-3 large diameter portion of downwind end of main shaft;
6 front housing body;
6-1 inner hold in the front housing body;
7 inner ring gear;
8 intermediate gear;
9 full complement roller bearing;
10 planet carrier;
101 main carrier body of the planet carrier;
102 upwind auxiliary carrier body of the planet carrier;
102-1 first planet gear shaft hole;
102-2 intermediate gear shaft hole;
10-1 planet gear shaft hole of the planet carrier;
10-2 intermediate gear shaft hole;
10-3 torsion arm;
10-4 central hole of the planet carrier;
11 intermediate gear shaft;
12 intermediate bearing of the planet gear shaft;
13 planet gear shaft;
14 rear housing body;
14-1 inner hole of the rear housing body;
15 second stage planet gear;
16 downwind bearing of planet gear shaft;
17 sun gear
18 rear housing cover;
19 generator stator main bearing;
20 tension force locking disc;
21 output shaft
21-1 upwind end of the output shaft
21-2 downwind end of the output shaft
22 generator rotor
22-1 upwind end of the generator rotor
22-1-1 inner hole of the upwind end of the generator rotor
22-2 downwind end of the generator rotor
23 generator stator
23-1 opening hole
24 output shaft bearing
25 spline connection

DETAILED DESCRIPTION OF THE INVENTION

Some of the many possible embodiments of the invention will be described below with the purpose of providing a basic understanding of the invention rather than identifying key elements or crucial elements of the invention or limiting the scope of protection. It can be easily understood that according to the technical solutions of the invention, those skilled in the art can propose other implementations that can be replaced with each other without departing from the true spirit of the invention. Therefore, the following specific embodiments and drawings are merely exemplary description of the technical solutions of the invention, and should not be considered as the entirety of the invention or as limiting or restricting the technical solutions of the invention.

For a clear and brief explanation, in the following description, not all the components shown in the accompanying drawings are described in detail. The drawings show many components that can be completely realized for completing the invention by those skilled in the art. For those skilled in the art, the operations of many components are familiar and obvious.

Herein, the terms "front" and "rear" are defined with respect to the direction in which wind is transmitted, and the terms "upwind" and "downwind" are defined with respect to the direction of the wind power generating apparatus relative to the wind when wind power is used to generate power; it should be understood that these directional terms are relative concepts and are used for description and clarification as to "relativity", and are not intended for limiting the orientations of any embodiment or the orientations of the components in any embodiment to a specific direction or orientation.

In the following description, while the "planet gear (e.g., the first stage planet gear and the second stage planet gear)" merely rotates around the planet gear shaft of its own and does not revolve around the sun gear, the concept of the "planet" herein can be understood as "planet gears" dispersedly arranged in a substantially circular orbit of the sun gear.

Figure 1:
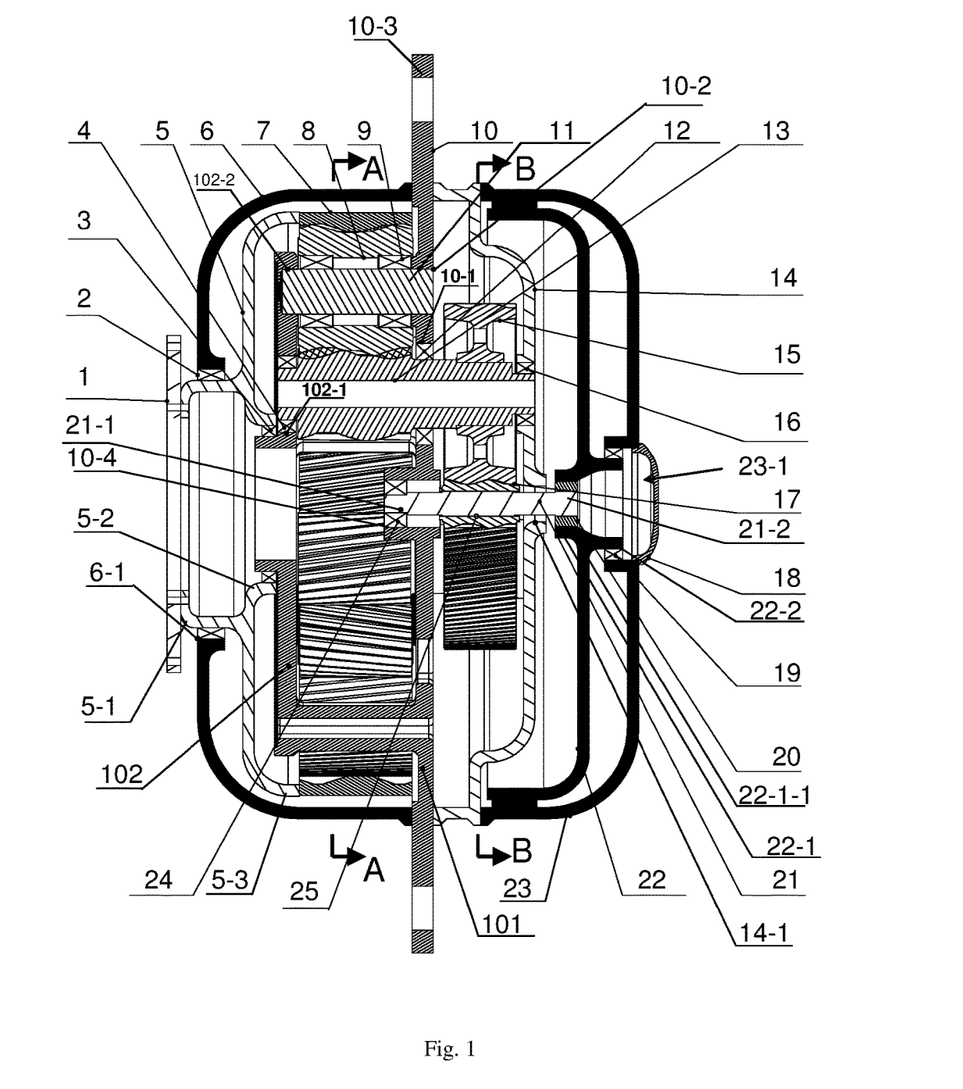
FIG. 1 is a schematic structural view of an integrative transmission chain of hybrid-drive wind turbine and a gearbox used by the transmission chain according to an embodiment of the invention.
Figure 2:
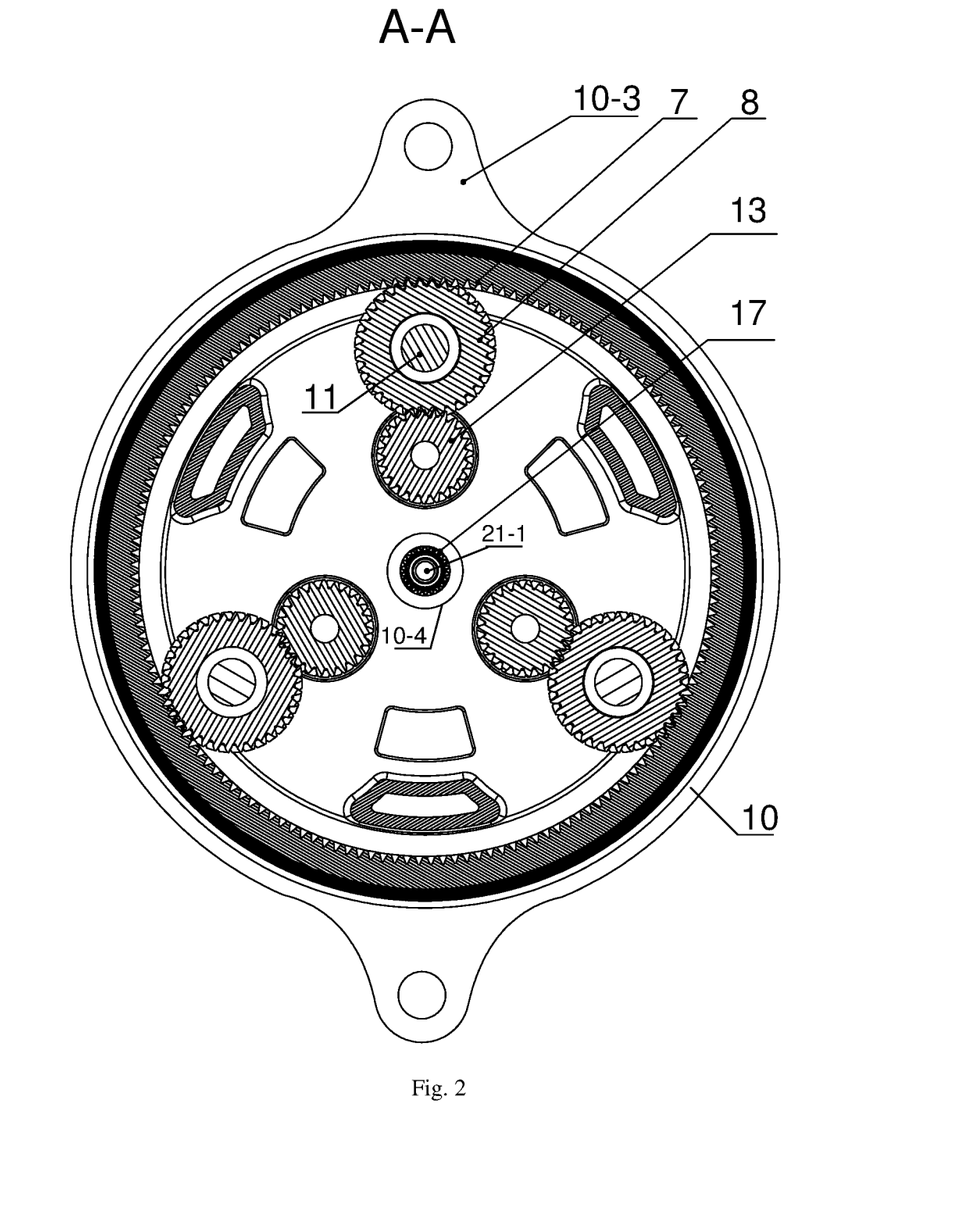
FIG. 2 is a schematic cross-section taken along line A-A of the integrative transmission chain of hybrid-drive wind turbine and a gearbox used by the transmission chain shown in FIG. 1.
Figure 3:
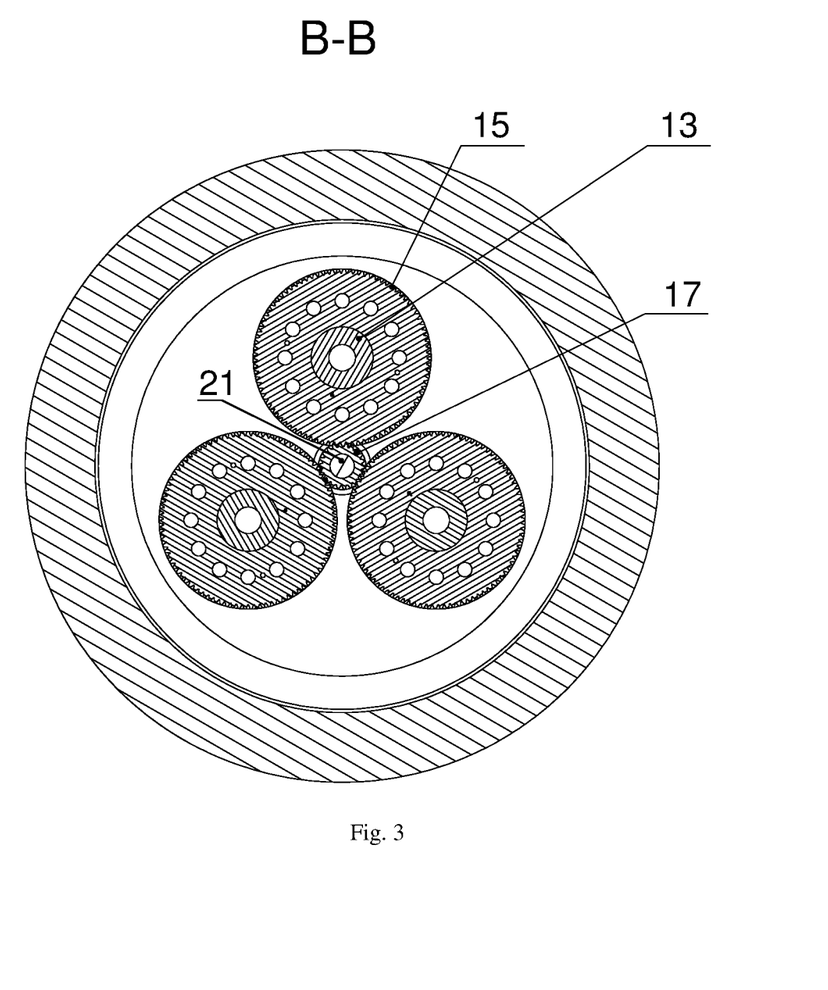
FIG. 3 is a schematic cross-section taken along line B-B of the integrative transmission chain of hybrid-drive wind turbine and a gearbox used by the transmission chain shown in FIG. 1.

FIG. 1 is a schematic structural view of an integrative transmission chain of hybrid-drive wind turbine and a gearbox used by the transmission chain according to an embodiment of the invention, FIG. 2 is a schematic cross-section taken along line A-A of the integrative transmission chain of hybrid-drive wind turbine and a gearbox used by the transmission chain shown in FIG. 1, and FIG. 3 is a schematic cross-section taken along line B-B of the integrative transmission chain of hybrid-drive wind turbine and a gearbox used by the transmission chain shown in FIG. 1. The gearbox and the transmission chain of hybrid-drive wind turbine which uses the gearbox according to the embodiment of the invention will be described below with reference to FIGS. 1 to 3.

As shown in FIG. 1 in the present embodiment, the gearbox has a front housing body 6, a rear housing body 14, a main shaft 5 and a planet carrier 10, wherein the planet carrier 10 is fixedly disposed between the front housing body 6 and the rear housing body 14, the front housing body 6 is disposed at an upwind side of the planet carrier 10, the rear housing body 14 is disposed at a downwind side of the planet carrier 10, and a space for accommodating the gearbox is formed between the front housing body 6 and the rear housing body 14. Specifically, a torsion arm 10-3 which extends out of the front housing body 6 and the rear housing body 14 is disposed on the planet carrier 10, and the torsion arm 10-3 can fix the whole gearbox onto the wind turbine.

In the present embodiment, the main shaft 5 comprises a main shaft upwind end 5-1, a small diameter portion of the downwind end of the main shaft 5-2, and a large diameter portion of the downwind end of the main shaft 5-3, wherein the main shaft upwind end 5-1 is supported in an inner hole 6-1 of the front housing body via a main shaft upwind bearing 2, the small diameter portion of the downwind end of the main shaft 5-2 is supported on the planet carrier 10 via a main shaft downwind bearing 3, the large diameter portion of the downwind end of the main shaft 5-3 is fixedly connected to the inner ring gear 7, and the connection between the inner ring gear 7 and the main shaft 5 comprises, but is not limited to, a fixed connection via welding or bolts; in this way, the main shaft 5 is rotatably disposed on the front housing body 6 and the planet carrier 10, and the main shaft upwind end 5-1 can rotate under the action of external wind power input, and further drives the small diameter portion of the downwind end of the main shaft 5-2 in rotation, especially the inner ring gear 7 in synchronous rotation. Specifically, the external wind power input be can realized through a hub connection flange 1 fixedly connected to the main shaft upwind end 5-1; optionally, the hub connection flange 1 can be connected directly to the hub of the wind turbine, or can be connected to the hub of the wind turbine via the wind wheel main shaft, and the hub connection flange 1 can be connected to the main shaft upwind end 5-1 of the main shaft 5 via bolts.

In the above embodiment, the main shaft 5 realize a dual-bearing support through the main shaft upwind bearing 2 and the main shaft downwind bearing 3, which is more advantageous for bearing the pitching moment of the main shaft 5 whose rotation is thus made more stable.

With continued reference to FIGS. 1 to 3, N intermediate gears 8 and N first stage planet gears in the gearbox are provided on the planet carrier 10, wherein N is an integer larger than or equal to 3, e.g., N is 3 as shown in the drawings. Each first stage planet gear is fixedly disposed on a corresponding planet gear shaft 13 which is fixedly provided with a second stage planet gear 15 rotating in synchronization with the first stage planet gear and having a larger diameter than the first stage planet gear. For example, the ratio of the second stage planet gear 15 and the first stage planet gear can be in a range of 2-3.

A first end of the planet gear shaft 13, i.e., the upwind end, is supported in a first planet gear shaft hole 102-1 of an upwind auxiliary carrier body 102 of the planet carrier via an upwind bearing 4 of the planet gear shaft, an intermediate section of the planet gear shaft 13 is supported in a second planet gear shaft hole 10-1 of the main carrier body 101 of the planet carrier via an intermediate bearing 12 of the planet gear shaft, and a second end of the planet gear shaft 13, i.e., the downwind end, is supported in the rear housing body 14 via a downwind bearing 16 of planet gear shaft; in this way, the planet gear shaft 13 is axially rotatably disposed on the planet carrier 10 and the rear housing body 14, and the planet gear shaft 13 has a good stability in axial rotation.

Moreover, the gearbox comprises an output shaft 21 which is axially rotatably disposed on the planet carrier 10 and has an end which protrudes out of the rear housing body 14. The output shaft 21 is provided thereon with a sun gear 17, with which each of the N second stage planet gears 15 engages, thus realizing converged transmission at the sun gear 17.

Wherein, each of the intermediate gears 8 engages with the inner ring gear 7, and correspondingly, an intermediate gear shaft 11 is provided for each intermediate gear 8. The intermediate gears 8 and the intermediate gear shafts 11 can be assembled together via full complement roller bearings. In this embodiment, the planet carrier 10 comprises the main carrier body 101 and the upwind auxiliary carrier body 102 which is fixedly disposed at an upwind side of the main carrier body 101. A space formed by the main carrier body 101 and the upwind auxiliary carrier body 102 can be used to place the intermediate gears 8 and the first stage planet gears; specifically, as shown in FIG. 1, the first end (i.e., the upwind end) of each intermediate gear shaft 11 is fixedly installed in an intermediate gear shaft hole 102-2 of the upwind auxiliary carrier body 102 of the planet carrier 10, and the second end (i.e., the downwind end) of the intermediate gear shaft 11 is fixedly installed in an intermediate gear shaft hole 10-2 of the main carrier body 101 of the planet carrier 10. Therefore, each intermediate gear shaft 11 is fixed on the planet carrier 10 and cannot rotate around itself (when the intermediate gear 8 rotates, the relatively fixed intermediate gear shaft 11 does not rotate axially). The N intermediate gear shafts 11 and the N intermediate gears 8 are distributed around the center of the planet carrier 10. The first stage planet gears are disposed at an upwind side of the planet gear shaft 13, e.g., between the upwind auxiliary carrier body 102 of the planet carrier 10 and the main carrier body 101; the second stage planet gears 15 are disposed at a downwind side of the planet gear shaft 13, e.g., between the main carrier body 101 of the planet carrier 10 and the rear housing body. By doing so, the N intermediate gears 8 and the N first stage planet gears are substantially in the planet carrier 10, and the sun gear 17 and the N second stage planet gears 15 are disposed in the cavity formed by the planet carrier 10 and the rear housing body 14, thus making the structure and arrangement reasonable and compact.

By introducing the plurality of intermediate gears 8, each intermediate gear 8 engages with the inner ring gear 7, and each first stage planet gear engages with a corresponding intermediate gear 8. Therefore, the inner ring gear 7, the intermediate gear 8 and the first stage planet gear form a first stage fixed shaft transmission pair, wherein there are shunt transmissions between the inner ring gear 7 and the plurality of intermediate gears 8, and movement is transmitted to the plurality of first stage planet gears in a shunted manner. Such a gear transmission enables the first stage planet gears to be configured with a small diameter, which is very advantageous for improving transmission ratio in a relatively compact space. Furthermore, the transmission efficiency is high, which is also suitable for high power transmission. The specific diameters of the intermediate gears 8 and the first stage planet gears can be selectively set as required for the specific transmission ratio.

Further, each second stage planet gear 15 engages with the sun gear 17 so as to form a second fixed shaft transmission pair with the sun gear 17, and thus a converged transmission is realized between the second stage planet gear 15 and the sun gear 17. Generally, the second stage planet gear 15 has a diameter far larger than that of the sun gear 17. In this manner, a high transmission ratio is also made easier, and the rotating speed of the output shaft 21 is increased. The fixed connection between the second stage planet gear 15 and the planet gear shaft 13 is not limiting. For example, an interference fitting connection or a flat key plus interference fitting connection can be used. Similarly, the fixed connection between the sun gear 17 and the output shaft 21 is also not limiting. For example, the sun gear 17 can have an inner spline therein, the output shaft 21 can have external spline outside, and the sun gear 17 and the output shaft 21 use the spline connection 25 to realize fixed connection.

It should be understood that the transmission ratio of the gearbox is affected by various factors, such as the gear ratio between the inner ring gear and the first stage planet gear, the gear ratio between the second stage planet gear and the sun gear, etc. In the present invention, introducing an intermediate gear 7 between the first stage planet gear and the inner ring gear 7 is at least advantageous for reducing the radial distance of the planet gear shaft 13 relative to the output shaft 21; in a certain range of transmission ratio (the range of transmission ratio is typically a basic requirement of gearbox transmission), the radial dimension of the second stage fixed shaft transmission pair structure can be further reduced. Therefore, as compared to the radial dimension of the first stage fixed shaft transmission pair structure, the radial dimension of the second stage fixed shaft transmission pair structure can be designed smaller. In a subsequent design of transmission chain, the rotor 22 of the generator is made accommodate or house a portion of the rear housing body 14 that protrudes towards the downwind end, i.e., the rotor 22 of the generator can at least radially accommodate or house the first stage fixed shaft transmission pair (as shown in FIG. 1). Therefore, the overall structure of the transmission chain is made compact.

With continued reference to FIGS. 1 to 3, the upwind end 21-1 of the output shaft 21 is supported on the main carrier body 101 of the planet carrier 10 via an output shaft bearing 24, and the downwind end 21-2 of the output shaft 21 protrudes out of the rear housing body 14 so as to be integrally connected to the generator. In the embodiment of the invention, the output shaft 21 is used as the output shaft of the gearbox, and the downwind end 21-2 thereof is connected with the upwind end 22-1 of the rotor 22 of the generator so as to directly drive the rotor 22 of the generator in rotation. Therefore, the output shaft 21 is supported and disposed between the planet carrier 10 and the rotor 22 of the generator. While the output shaft 21 is lengthened, an integral connection of the gearbox and the generator is realized. That is, an integrative transmission chain is realized so that the overall length of the transmission chain in the axial direction is reduced and the structure has a higher integration level; moreover, the output shaft 21 is lengthened (since the upwind end 21-1 thereof is on the planet carrier and the downwind end 21-2 thereof is on the rotor 22 of the generator) to have a length which is even larger than the width of the second stage planet gear 15, thus forming a long force arm so that the pitching moment of the rotor 22 of the generator can be borne by a small output shaft bearing 24; further, since the output shaft 21 is directly connected to the upwind end 22-1 of the rotor 22 of the generator, a possibility of eccentricity among the main shaft 5, the output shaft 21 and the main shaft of the generator is reduced, which is advantageous for improving the performance and life time of the wind turbine.

Figure 4:
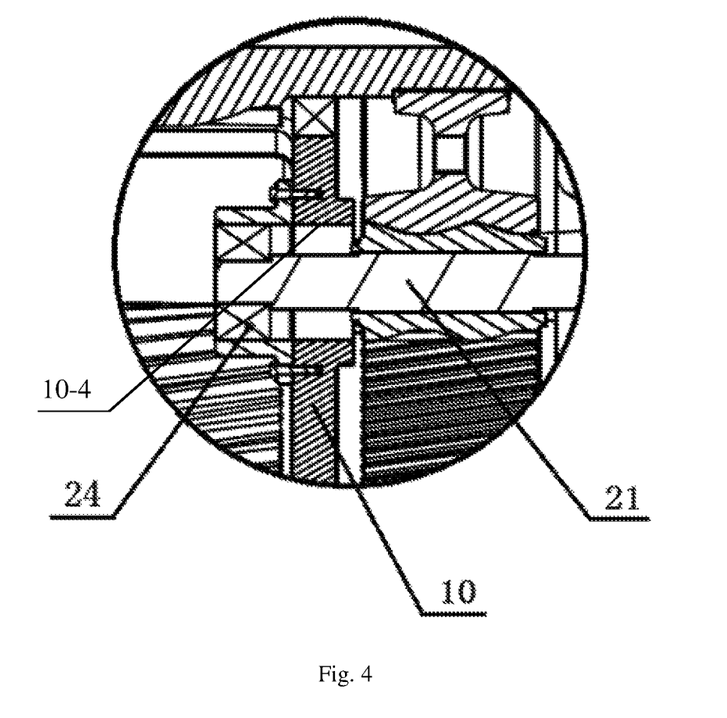
FIG. 4 is another schematic view showing the installation of an output shaft bearing according to another embodiment of the invention.

In an embodiment, the axis of the main shaft 5 and the axis of the output shaft 21 are on the same straight line; the bearing block of the output shaft bearing 24 can be integrally formed with a central hole 10-4 of the main carrier body 101 of the planet carrier 10; in an alternative embodiment, as shown in FIG. 4, the bearing block of the output shaft bearing 24 is fixedly installed on an upwind face of the main carrier body 101 of the planet carrier 10, and faces right the downwind central hole 10-4 of the planet carrier.

With continued reference to FIG. 1, in the transmission chain according to the embodiment of the invention, the rotor 22 of the generator not only comprises an upwind end 22-1, but also comprises a downwind end 22-2 which is supported in an inner hole of the stator 23 of the generator via a generator stator main bearing 19. In this way, the transmission chain of hybrid-drive wind turbine according to the embodiment of the invention is formed integrally, which is very advantageous for reducing the axial dimension of the transmission chain. The rear housing body 14 at least partially protrudes towards the downwind end so as to form a cavity which at least accommodates the sun gear 17 and the N second stage planet gears 15. Moreover, the radial dimension of the rotor 22 of the generator is larger than a dimension range of the positions of the second stage planet gears 15 relative to the output shaft 21 so that the rotor 22 of the generator can easily accommodate the portion of the rear housing body 14 which protrudes towards the downwind end; meanwhile, the largest radial dimension of the stator 23 of the generator can be larger than or equal to the largest radial dimension of the rear housing body 14, the stator 23 of the generator houses the rotor 22 of the generator, and the circumferential end face of the stator 23 of the generator is connected to the rear housing body 14 via bolts (for facilitating assembling and disassembling the stator 23 of the generator). In this way, the rear housing body 14, the rotor 22 of the generator and the stator 23 of the generator form an integral integrated structure as shown in FIG. 1, wherein the generator is well integrated with the gearbox, which further reduces the axial dimension of the transmission chain and makes the structure more compact. Specifically, an air gap can be provided between the rotor 22 of the generator and the stator 23 of the generator.

In this embodiment, the downwind end 21-2 of the output shaft 21 can be fixedly connected to an inner hole 22-1-1 of the upwind end 22-1 of the rotor 22 of the generator in a detachable manner via a tension force locking disc 20, and the diameters of both the inner hole 22-1-1 and the inner hole 14-1 of the rear housing body 14 are larger than the diameter of the sun gear 17 (it is noted that when the output shaft 21 penetrates the inner hole 14-1, the rear housing body 14 does not have to provide support for the output shaft 21); the stator 23 of the generator is provided with an opening hole 23-1 at a position right facing the output shaft 21, and a rear housing cover 18 is detachably installed in the opening hole 23-1. By doing so, in a case where both the diameter of the inner hole 22-1-1 of the upwind end 22-1 of the rotor 22 of the generator and the diameter of the inner hole 14-1 of the rear housing body 14 are larger than the diameter of the sun gear 17 and the components such as the rear housing cover 18 are detachably, the sun gear 17 and the output shaft 21 which have the highest speed in the whole transmission chain and are most vulnerable to problems can be extracted directly from the inner hole of the rotor 22 of the generator without the need for detaching the whole transmission chain, thus greatly facilitating installing and repairing.

When the gearbox and the transmission chain thereof according to the above embodiments are applied to a wind power generating apparatus, the transmission operation principle is described as follows:

The torque acquired by the impeller of the wind turbine from wind energy is input and transmitted to the main shaft 5 via the hub connection flange 1, and the inner ring gear 7 is driven in synchronous rotation at the same time when the main shaft 5 is driven in rotation. The inner ring gear 7 meshes with N intermediate gears 8 so that N shunt transmissions are formed. The rotations of N intermediate gears 8 can respectively transmit power to N first stage planet gears, and the planet gear shaft 13 of each first stage planet gear drives the second stage planet gear 15 in synchronous rotation. Further, N second stage planet gears 15 mesh with the same one sun gear 17 so that a converged transmission is realized. The sun gear 17 drives the output shaft 21 in synchronous rotation via spline connection so that a high speed output of the output shaft 21 is realized; the output shaft 21 can further drive the rotor 22 of the generator in rotation via the locking disc 20, thus realizing the power generating function.

The gearbox and the transmission chain which uses the gearbox according to the above embodiments have at least one of the following many advantages, especially the following advantages (1), (2) and (3):

(1) as compared to the conventional two stage NGW solution, although N intermediate gears are additionally provided, one inner ring gear, one sun gear, one planet carrier and one intermediate box body are also omitted, the structure is simple, the cost is reduced, and a large transmission ratio can still be realized, which is very suitable for a high power wind power generating apparatus;

(2) the whole transmission chain has a high integration level; by reasonably arranging crucial elements and component such as the main shaft, the planet carrier or the like, and by an unique layout and design of gears as well as an elaborate design in assembling, the axial dimension can be greatly reduced under the premise that the radial dimension is relatively limited;

(3) the planet carrier is fixed and stationary, i.e., does not rotate, and can be fixed on other components through the torsion arm thereof; the planet carrier and the torsion arm thereof can bear the main torque input from the hub connection flange and the weight of the whole transmission chain, and can bear the main shaft, the front housing body, the rear housing body, the intermediate gears, the planet gear shafts, and the output shaft, etc;

(4) the axis of the main shaft of the gearbox and the axis of the output shaft can be on the same straight line, and the gearbox is integrally connected to the generator, thus reducing a possibility of eccentricity among the main shaft, the output shaft and the main shaft of the generator and improving the performance and life time of the wind turbine;

(5) in a conventional two stage NGW solution, two planet carriers drive a two stage planet gear to revolve, and it is required to lubricate the revolving body, whereas in the present invention, the planet gears are not revolving, and the rotating center shafts thereof (i.e., the planet gear shafts) are fixed on a rigid body (that is, the first end of the planet gear shaft is supported in the planet gear shaft hole 102-1 of the upwind auxiliary carrier body of the planet carrier via the planet gear shaft upwind bearing, the intermediate section of the planet gar shaft is supported in the planet gear shaft hole 10-1 of the main carrier body of the planet carrier via the planet gear shaft intermediate bearing, and the second end of planet gear shaft is supported in the rear housing body via the planet gear shaft downwind bearing); therefore, there is no need to lubricate the revolving body, thus simplifying the lubrication design of the planet gears;

(6) in a conventional two stage NGW solution, 2×N planet gears receive loads at both faces, whereas in the present invention, only N intermediate gears receive loads at both faces, thus decreasing the possibility of failure of gears;

(7) the rotor of generator and the stator of generator can be designed to have a larger radial dimension than the axial dimension, thus shortening the axial dimension of the transmission chain; the whole generator structure comprises a part of the rear housing body, which further shortens the axial dimension of the transmission chain; the radial dimension of the stator of generator is equal to or close to the largest dimension of the rear housing body, and therefore the radial dimension of the whole transmission chain is not increased; thus, the volume of the whole transmission chain is reduced and the weight of the transmission chain is reduced;

(8) the installation, assembling the disassembling of the generator and the gearbox are very easy and convenient;

(9) the sun gear and the output shaft which have the highest speed in the whole transmission chain and are most vulnerable to problems can be extracted directly from the inner hole of the rotor of the generator without the need for detaching the whole transmission chain, thus greatly facilitating installing and repairing;

(10) while the radial dimension of the transmission chain is small, the length of the output shaft is kept large (since the upwind end of the output shaft is on the planet carrier and the downwind end of the output is on the rotor of the generator) and is even larger than the width of the second stage planet gear, thus forming a long force arm so that the pitching moment of the rotor of the generator can be borne by a small output shaft bearing.

The above embodiments mainly describe compliance detecting methods of payment applications in a virtualized environment according to the invention. While only some of the embodiments of the invention have been described, those skilled in the art will understand that the invention can be carried out in many other forms without departing from the spirit and scope thereof. Therefore, the illustrated examples and embodiments should be interpreted as schematic rather than limiting, and the invention can cover various modifications and replacements without departing form the spirit and scope of the invention defined by the appended claims.

What is claimed is:

1. A gearbox is provided for a transmission chain of hybrid-drive wind turbine, comprising a front housing body, a rear housing body, a main shaft and a planet carrier, characterized in that:

the planet carrier is fixedly disposed between the front housing body and the rear housing body, and the main shaft is rotatably disposed on the front housing body and the planet carrier;

the gearbox further comprises:

an inner ring gear fixedly disposed on the main shaft;

N planet gear shafts that are axially rotatably disposed on the planet carrier and the rear housing body, each of the planet gear shafts is provided with a first stage planet gear and a second stage planet gear, wherein N≥3;

intermediate gears correspondingly disposed between each first stage planet gear and the inner ring gear; and an output shaft whose upwind end is axially rotatably disposed on the planet carrier and whose downwind end protrudes outside the rear housing body;

a sun gear disposed on the output shaft;

wherein N intermediate gears and N first stage planet gears are disposed in the planet carrier, the sun gear, and N second stage planet gears are disposed in a cavity formed by the planet carrier and the rear housing body;

wherein the inner ring gear, the intermediate gear and the first stage planet gear form a first stage fixed shaft transmission pair, and the second stage planet gear and the sun gear form a second stage fixed shaft transmission pair.

2. The gearbox according to claim 1, wherein the main shaft comprises a main shaft upwind end, a small diameter portion of the downwind end of the main shaft, and a large diameter portion of the downwind end of the main shaft, wherein the main shaft upwind end is supported in an inner hole of the front housing body via a main shaft upwind bearing, the small diameter portion of the downwind end of the main shaft is supported on the planet carrier via a main shaft downwind bearing, and the large diameter portion of the downwind end of the main shaft is fixedly connected to the inner ring gear.

3. The gearbox according to claim 2, wherein the main shaft upwind end is connected to a hub connection flange.

4. The gearbox according to claim 3, wherein the hub connection flange is connected directly to a hub of the wind turbine, or is connected to the hub of the wind turbine via a wind wheel main shaft.

5. The gearbox according to claim 1, wherein the N first stage plane gears are disposed at an upwind end of the planet gear shafts, and the N second stage plane gears are disposed at a downwind end of the planet gear shafts.

6. The gearbox according to claim 1, wherein a first end of the planet gear shaft is supported in a first planet gear shaft hole of an upwind auxiliary carrier body of the planet carrier via an upwind bearing of the planet gear shaft, an intermediate section of the planet gear shaft is supported in a second planet gear shaft hole of the main carrier body of the planet carrier via an intermediate bearing of the planet gear shaft, and a second end of the planet gear shaft is supported on the rear housing body via a downwind bearing of planet gear shaft.

7. The gearbox according to claim 1, wherein an intermediate gear shaft is correspondingly provided for each intermediate gear, the intermediate gears are connected to the intermediate gear shafts via full complement roller bearings, a first end of the intermediate gear shaft is fixedly installed in a first intermediate gear shaft hole of the upwind auxiliary carrier body of the planet carrier, and a second end of the intermediate gear shaft is fixedly installed in a second intermediate gear shaft hole of the main carrier body of the planet carrier.

8. The gearbox according to claim 1, wherein the sun gear is connected to the output shaft via spline connection.

9. The gearbox according to claim 1, wherein the upwind end of the output shaft is supported on the planet carrier via an output shaft bearing.

10. The gearbox according to claim 9, wherein a bearing block of the output shaft bearing is integrally formed with a central hole of the main carrier body of the planet carrier; or the bearing block of the output shaft bearing corresponds to the central hole of the main carrier body of the planet carrier and is fixedly installed on an upwind face of the main carrier body of the planet carrier.

11. The gearbox according to claim 1, wherein the inner ring gear engages with the intermediate gears, and each intermediate gear engages with a corresponding first stage planet gear, a plurality of the second stage planet gears engage with the sun gear, and the second stage planet gear has a larger diameter than the first stage planet gear.

12. The gearbox according to claim 1, wherein an axis of the main shaft and an axis of the output shaft are on a same straight line.

13. The gearbox according to claim 1, wherein a torsion arm, which radially extends out of the front housing body and the rear housing body, is disposed on the planet carrier.

14. An integrative transmission chain of hybrid-drive wind turbine which uses the gearbox according to claim 1, characterized in that the downwind end of the output shaft is connected to an upwind end of a rotor of a generator so as to drive the rotor of the generator in rotation, and a downwind end of the rotor of the generator is supported in an inner hole of a stator of the generator via a generator stator main bearing.

15. The transmission chain of hybrid-drive wind turbine according to claim 14, wherein an air gap is provided between the rotor of the generator and the stator of the generator.

16. The transmission chain of hybrid-drive wind turbine according to claim 14, wherein the rear housing body partially protrudes towards the downwind end of the rotor so as to form a cavity which at least accommodates the sun gear and the N second stage planet gears, and the rotor of the generator accommodates the portion of the rear housing body which protrudes towards the downwind end of the rotor.

17. The transmission chain of hybrid-drive wind turbine according to claim 15, wherein the largest radial dimension of the stator of the generator is larger than or equal to the largest radial dimension of the rear housing body, and the stator of the generator houses the rotor of the generator.

18. The transmission chain of hybrid-drive wind turbine according to claim 14, wherein both the diameter of the inner hole of the upwind end of the rotor of the generator and the diameter of the inner hole of the rear housing body are larger than the diameter of the sun gear.

19. The transmission chain of hybrid-drive wind turbine according to claim 14, wherein the stator of the generator is fixedly connected to the rear housing body in a detachable manner.

20. The transmission chain of hybrid-drive wind turbine according to claim 14, wherein the stator of the generator is provided with an opening hole at a position right facing the output shaft, and a rear housing cover is detachably installed in the opening hole.

21. The transmission chain of hybrid-drive wind turbine according to claim 14, wherein the downwind end of the output shaft is fixedly connected to an inner hole of the upwind end of the rotor of the generator in a detachable manner via a tension force locking disc.

22. A wind power generating apparatus, characterized by comprising an integrative transmission chain of hybrid-drive wind turbine according to claim 1.

* * * * *